US012512289B2

(12) United States Patent
Klausz et al.

(10) Patent No.: US 12,512,289 B2
(45) Date of Patent: Dec. 30, 2025

(54) X-RAY TUBE ANODE WITH OPTIMIZED AREA FOCAL SPOT TRACK

(71) Applicant: GE Precision Healthcare LLC, Wauwatosa, WI (US)

(72) Inventors: Rémy Klausz, Neuilly sur Seine (FR); Pierre Habig, Rambouillet (FR)

(73) Assignee: GE Precision Healthcare LLC, Wauwatosa, WI (US)

( * ) Notice: Subject to any disclaimer, the term of this patent is extended or adjusted under 35 U.S.C. 154(b) by 179 days.

(21) Appl. No.: 18/243,283

(22) Filed: Sep. 7, 2023

(65) Prior Publication Data

US 2025/0087439 A1 Mar. 13, 2025

(51) Int. Cl.
*H01J 35/10* (2006.01)

(52) U.S. Cl.
CPC ......... *H01J 35/10* (2013.01); *H01J 2235/081* (2013.01); *H01J 2235/084* (2013.01); *H01J 2235/086* (2013.01); *H01J 2235/1291* (2013.01)

(58) Field of Classification Search
None
See application file for complete search history.

(56) References Cited

U.S. PATENT DOCUMENTS 1,953,813 A * 4/1934 Matsushima .......... H01J 35/112 313/355
2,942,126 A 6/1960 Silbermann
3,414,754 A * 12/1968 Elsas ........................ H01J 35/10 378/144
3,689,795 A 9/1972 Friedrich
3,795,832 A * 3/1974 Holland .................. H01J 35/10 378/127
3,821,581 A * 6/1974 Holland et al. ......... H01J 35/10 378/127

(Continued)

FOREIGN PATENT DOCUMENTS

DE 102005062448 A1 7/2007
DE 102009035439 A1 8/2010

(Continued)

OTHER PUBLICATIONS

DE102005062448 English Abstract, Espacenet.com Sep. 10, 2025; 1 page.

(Continued)

*Primary Examiner* — Thomas R Artman
(74) *Attorney, Agent, or Firm* — Boyle Fredrickson S.C.

(57) ABSTRACT

An anode for an X-ray tube is provided to reduce the incidence of off-focus x-ray emissions from the anode. The anode has a rotating component, a body operably connected to the rotating component and adapted to rotate in conjunction with the rotating component, and at least one emissive material track defined on the body wherein the at least one emissive material track has a first width, and wherein the first width is less than or equal to twice a second width of a focal spot track on the body. Further, to enhance the reduction in the off-focus x-ray emission, the emissive material track is formed of a material having a first atomic number and the body is formed of a material having a second atomic number with a ratio of the first atomic number to the second atomic number being at least 6.

20 Claims, 8 Drawing Sheets

(56) References Cited

U.S. PATENT DOCUMENTS

| | | | | | |
|---|---|---|---|---|---|
| 3,973,156 | A * | 8/1976 | Schreiber | H01J 35/10 | 378/144 |
| 4,573,185 | A * | 2/1986 | Lounsberry | H01J 35/02 | 378/144 |
| 4,637,042 | A * | 1/1987 | Braun | H01J 35/108 | 378/143 |
| 4,920,551 | A | 4/1990 | Takahashi et al. | | |
| 5,065,419 | A * | 11/1991 | Leguen | H01J 35/10 | 378/138 |
| 6,377,660 | B1 * | 4/2002 | Ukita | H01J 35/112 | 378/126 |
| 7,023,950 | B1 * | 4/2006 | Annis | G01N 23/044 | 378/146 |
| 8,520,803 | B2 * | 8/2013 | Behling | H01J 35/10 | 378/124 |
| 9,053,898 | B2 * | 6/2015 | Kraft | H01J 35/106 | |
| 9,812,281 | B2 * | 11/2017 | Lu | H01J 35/10 | |
| 10,483,077 | B2 * | 11/2019 | Morton | G21K 1/02 | |
| 11,469,071 | B2 * | 10/2022 | Behling | H01J 35/104 | |
| 11,844,641 | B2 * | 12/2023 | Fuller | A61B 6/40 | |
| 11,996,259 | B2 * | 5/2024 | Reed | G01N 23/207 | |
| 2007/0153979 | A1 * | 7/2007 | Baumann | A61B 6/4021 | 378/138 |
| 2011/0135066 | A1 * | 6/2011 | Behling | H01J 35/10 | 378/138 |
| 2014/0355742 | A1 * | 12/2014 | Kraft | H01J 35/106 | 378/143 |
| 2015/0340190 | A1 * | 11/2015 | Lu | H01J 35/16 | 378/62 |
| 2016/0343533 | A1 * | 11/2016 | Morton | G21K 1/02 | |
| 2020/0388461 | A1 * | 12/2020 | Behling | H01J 35/108 | |
| 2022/0328277 | A1 * | 10/2022 | Fuller | H05G 1/52 | |
| 2022/0390395 | A1 * | 12/2022 | Reed | G01N 23/2208 | |
| 2025/0087439 | A1 * | 3/2025 | Klausz | H01J 35/10 | |

FOREIGN PATENT DOCUMENTS

| | | | |
|---|---|---|---|
| EP | 3496128 | A1 | 6/2019 |
| WO | 2017204850 | W | 11/2017 |

OTHER PUBLICATIONS

DE102009035439 English Abstract, Espacenet.com Sep. 10, 2025; 1 page.

EP application 24195067.4 filed Aug. 16, 2024—extended Search Report issued Jun. 10, 2025; 16 pages.

* cited by examiner

X-RAY TUBE ANODE WITH OPTIMIZED AREA FOCAL SPOT TRACK

BACKGROUND OF THE INVENTION

The invention relates generally to X-ray tubes and, more particularly, to structures and methods of construction for the anode utilized in an X-ray tube.

X-ray systems, including computed tomography (CT) imaging systems, may include an X-ray tube, a detector, and a support structure for the X-ray tube and the detector. In operation, an imaging table, on which an object is positioned, may be located between the X-ray tube and the detector. The X-ray tube typically emits radiation, such as X-rays, toward the object. The radiation passes through the object on the imaging table and impinges on the detector. As radiation passes through the object, internal structures of the object cause spatial variances in the radiation received at the detector. The detector then generates data, and the system translates the data into an image, which may be used to evaluate the internal structures of the object. The object may include, but is not limited to, a patient in a medical imaging procedure or an inanimate object as in, for instance, a package.

X-ray tubes include a cathode and an anode having an anode target located within a high-vacuum environment. The anode is disposed in front of the cathode so that the focused electron beam from the cathode is accelerated across a cathode-to-anode vacuum gap and produces X-rays upon impact with the focal spot on the anode target. Electrons from the cathode hit successively different points of the anode target to reduce the maximum temperature reached locally by the anode target. In many configurations the anode is a circular material piece supported by a bearing structure to enable the anode to rotate in front of the cathode. Because of the high temperatures generated when the electron beam strikes the anode target, it is often necessary to rotate the anode assembly at a high rotational speed, causing the focal spot to be directed onto the rotating anode target along a focal spot track defined by the path of the focal spot along the rotating anode target, where the length L of the focal spot defines the width W of the focal spot track extending around the perimeter of the anode target.

As shown in FIGS. 1 and 2, the construction of a prior art anode 1000 typically includes a central shaft 1002 to which is secured a disc- or drum-shaped support member 1004. The support member 1004 is formed of a support material 1006 that constitutes the majority of the mass and volume of the anode 1000 and that has the desired properties with respect to emission of X-rays, i.e., the support material 1006 is a relatively non-emissive material that does not readily emit X-rays when struck by the electrons/electron beam from the cathode.

When a larger anode 1000 is desired to further increase the instant peak power on focal spot, due to weight considerations for a rotating anode 1000, the anode 1000 is made of two or more materials. In particular, the material forming the support member 1004 can be selected to be a lighter material than if the support member 1004 were designed to directly emit X-rays. In order to emit X-rays from the anode 1000, the support member 1004 is coated with a layer of an emission material 1008 having properties suitable for the emission of X-rays when struck by the beam of electrons from the cathode. The layer of electron emissive material 1008 has width between an outer diameter 1011 and an inner diameter 1013 of the support member 1004 of between 70 mm and 200 mm, such that the emissive material layer 1008 is disposed substantially over the entire surface 1010 of the support member 1004 that faces or positioned towards the cathode and the electron beam generated by the cathode. The electron beam is directed by the cathode onto a focal spot 1015 that is projected along a focal spot track 1012 on the layer of emissive material 1008 as the anode 1000 is rotated in order to direct the X-ray emitted from the emission material towards the desired area of the object being imaged and the detector. The size of the focal spot track 1012 can vary depending upon type or modality of imaging being performed by the X-ray tube including the anode 1000, as illustrated on the drum anode 1014 shown in FIG. 3 including a longer focal spot track 1016 and a shorter focal spot track 1018, each of which correspond in width W to the length L of the associated focal spot 1015 for each track 1016,1018, but the electron beam is specifically directed onto the specified focal spot track 1012,1016,1018 to enable the X-rays emitted from the layer of emissive material 1008 to be emitted onto the desired area of the object and detector.

While many of the electrons 1020 in the electron beam striking the emissive material layer 1008 cause the emissive material to emit X-rays 1022 within the focal spot track 1012, other electrons 1024 striking the emissive material layer 1008 can bounce or rebound off of the emissive material layer 1008, as shown in FIG. 4. Some of these rebounding electrons 1024 can be attracted back towards the anode 1000 to strike the emissive material layer 1008 outside of the focal spot track 1012, as the width of the emissive material layer 1008, i.e., 120 mm-150 mm, greatly exceeds the width of the focal spot track 1012, e.g., 0.10 mm-10.0 mm. When the rebounding electrons 1024 strike the emissive material layer 1008 again outside of the focal spot track 1012, they can also cause X-rays 1026 to be emitted from the emissive material layer 1008. However, as these X-rays 1026 emitted are not within the focal spot track 1012,1016,1018, the X-rays 1026 created by the rebounding electrons 1024 form off-focus radiation that is directed towards the object being imaged and the detector. This off-focus radiation can significantly degrade the sharpness and overall image quality of the image produced by the detector from the X-rays passing through the object prior to reaching the detector.

Therefore, it is desirable to develop an improved anode structure that significantly limits the generation of off focus radiation and that can significantly reduce the material costs associated with the construction of the anode.

BRIEF DESCRIPTION OF THE DISCLOSURE

In one exemplary embodiment of the invention, an anode for an X-ray tube has a rotating component, a body operably connected to the rotating component and adapted to rotate in conjunction with the rotating component, and at least one emissive material track defined on the body wherein the at least one emissive material track has a first width, and wherein the first width is less than or equal to twice a second width of a focal spot track on the body.

In another exemplary embodiment of the invention, an X-ray tube has a cathode assembly, and an anode assembly spaced from the cathode assembly, wherein the anode assembly includes a shaft, a sleeve disposed on the shaft, wherein one of the shaft and the sleeve is rotatable with regard to the other to form a rotating component and a stationary component, a body attached to the rotating component, and at least one emissive material track disposed on the body, wherein the at least one emissive material track has a first width, wherein the first width is less than or equal to twice a second width of a focal spot track on the body.

In still another exemplary embodiment of the disclosure, a method for minimizing off focus radiation generated in an imaging procedure using an X-ray tube includes the steps of providing an X-ray tube having a cathode assembly, and an anode assembly spaced from the cathode assembly, wherein the anode assembly includes a shaft, a sleeve disposed on the shaft, wherein one of the shaft and the sleeve is rotatable with regard to the other to form a rotating component and a stationary component, a body attached to the rotating component; and at least one emissive material track defined on the body, wherein the at least one emissive material track has a first width, and wherein the first width is less than or equal to twice a second width of a focal spot track on the body, directing the electron beam from the cathode assembly onto at least one the emissive material track along the focal spot track, and enabling electrons from the electron beam bouncing off of the emissive material track to contact the body on either side of the at least one emissive material track, wherein the emissive material track is formed of a material having a first atomic number and wherein the body is formed of a material having a second atomic number and wherein a ratio of the first atomic number to the second atomic number is at least 6.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
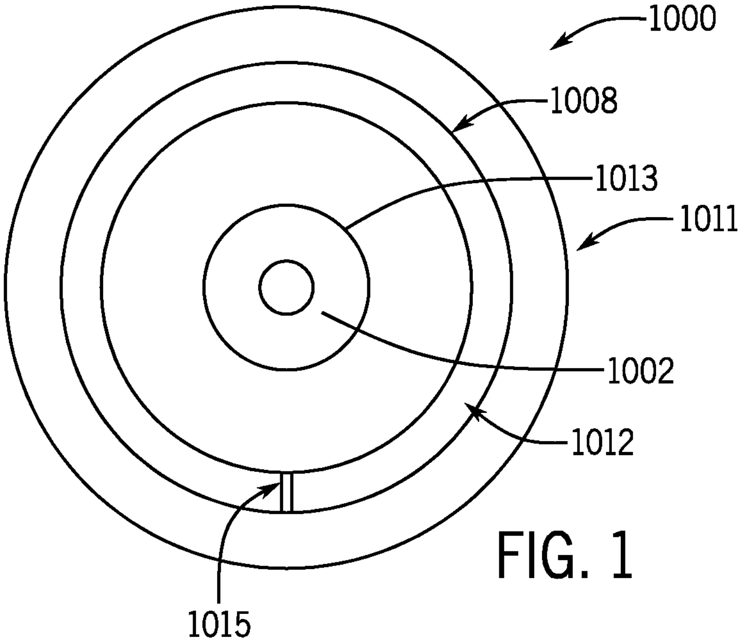
FIG. 1 is a top plan view of a prior anode structure of an X-ray tube.
Figure 2:
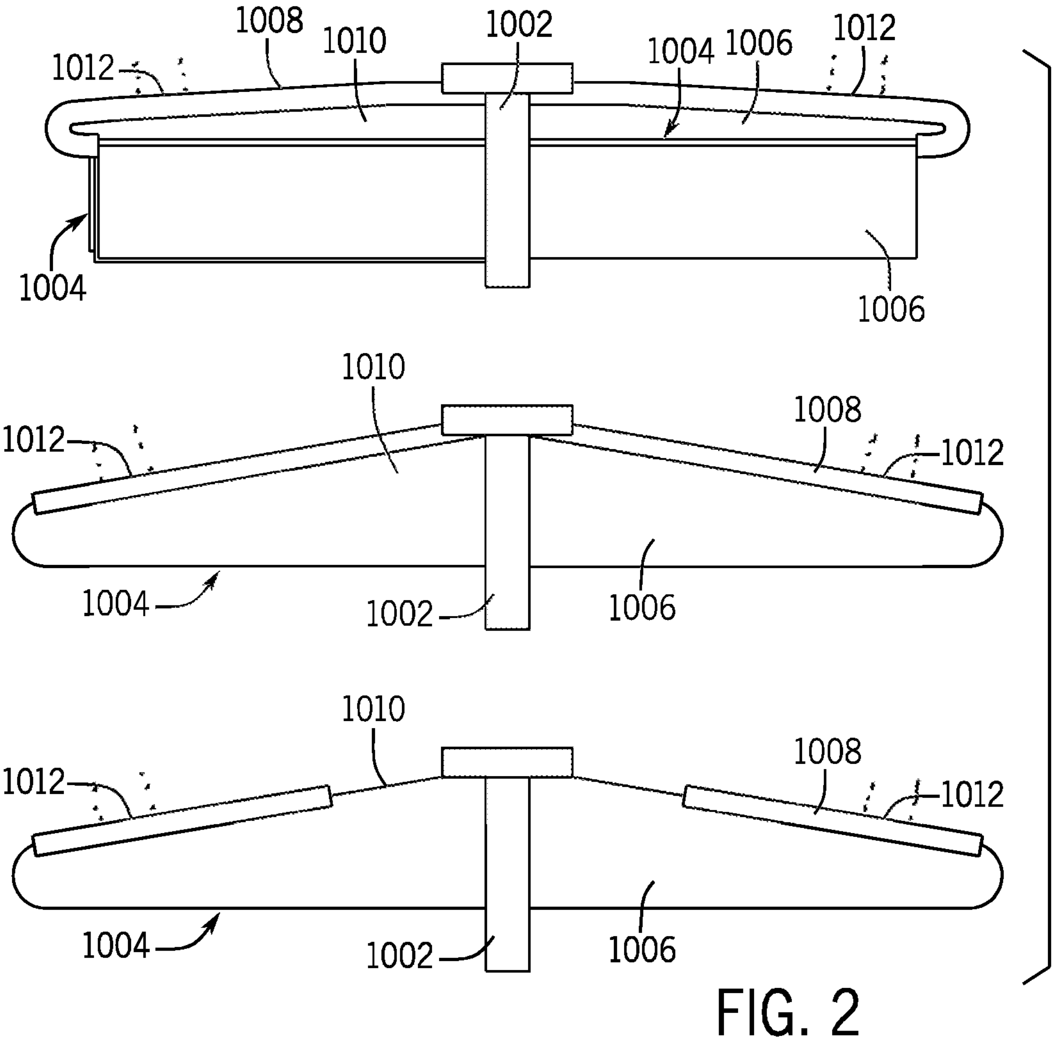
FIG. 2 illustrates different anode constructions of a prior art anode including an emissive material layer.
Figure 3:
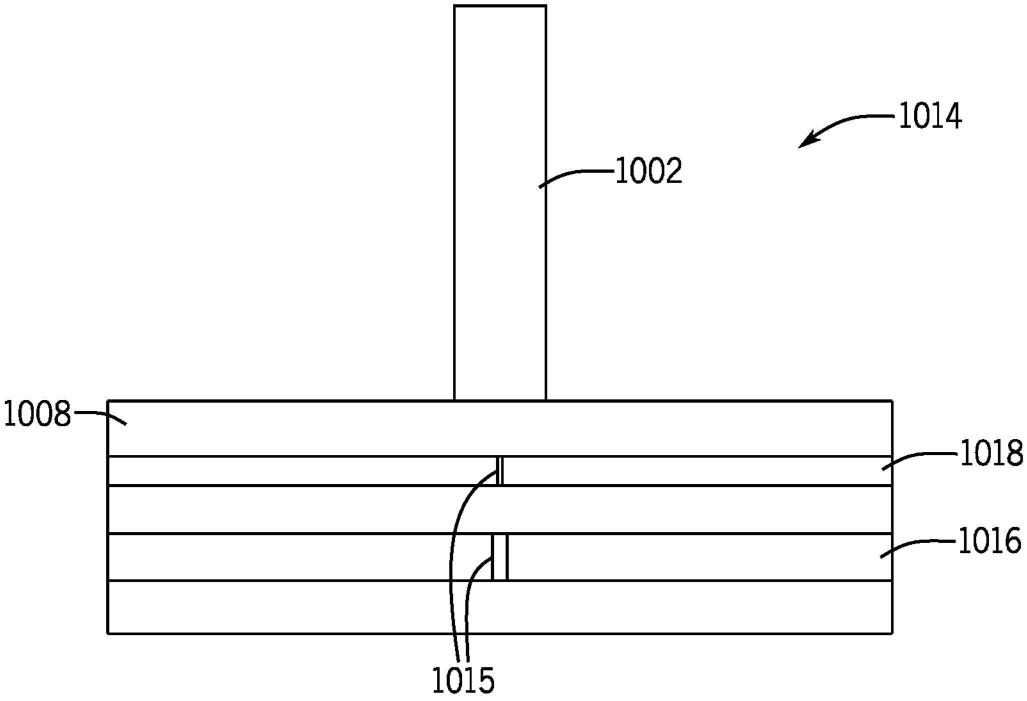
FIG. 3 is a side elevational view of a prior art drum anode structure of an X-ray tube.
Figure 4:
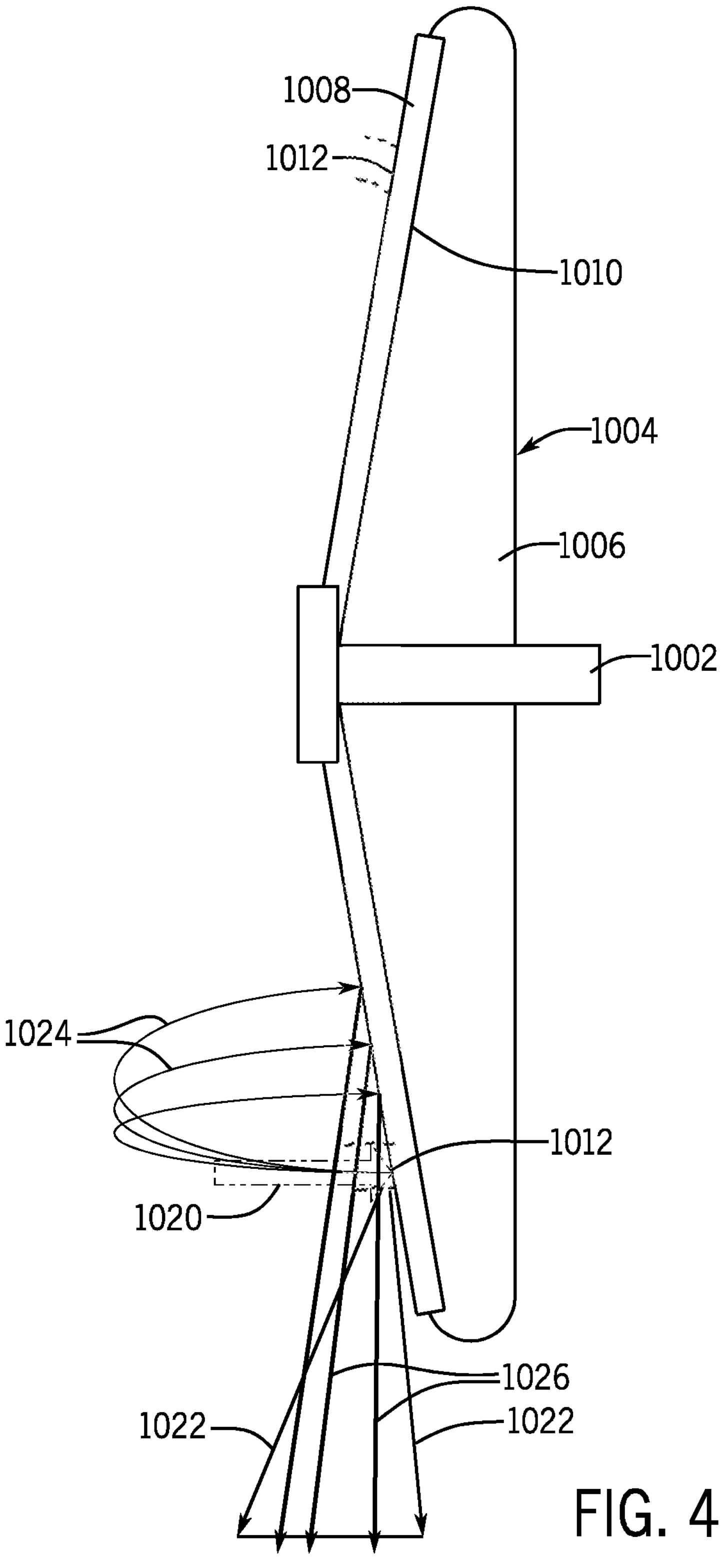
FIG. 4 is a schematic view of the creation of off-focus radiation from electrons bouncing off of a focal spot track on the prior art anode of FIG. 1.
Figure 5:
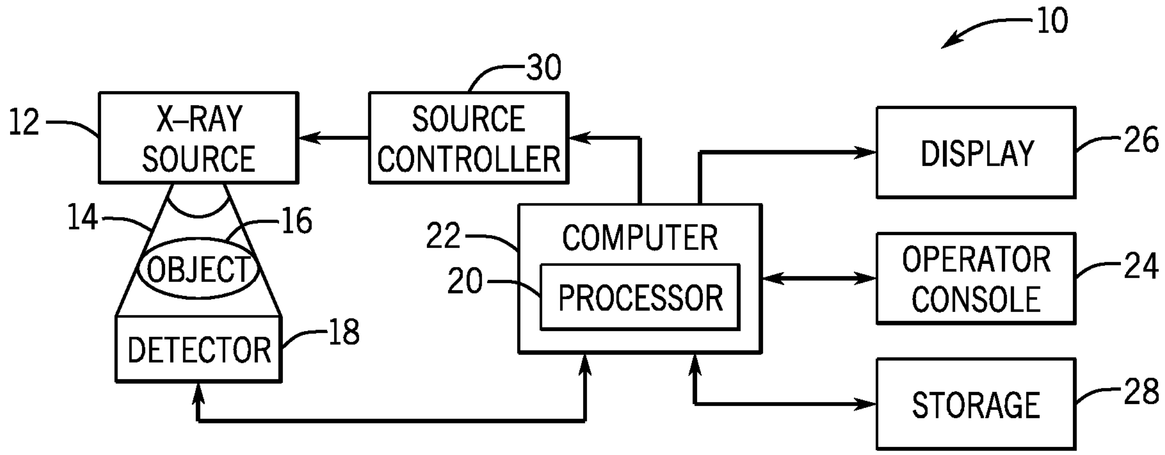
FIG. 5 is a block diagram of an imaging system incorporating exemplary embodiments of the disclosure.

FIG. 5 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an X-ray tube, such as X-ray imaging systems or fluoroscopic imaging systems. Other imaging systems such as computed tomography (CT) imaging systems, digital breast tomography (DBT) imaging systems and digital radiography (RAD) imaging systems, which acquire image three-dimensional data for a volume, also benefit from the invention. The following discussion of X-ray imaging system 10 is merely an example of one such implementation and is not intended to be limiting in terms of modality.

As shown in FIG. 5, imaging system 10 includes an X-ray tube or X-ray source 12 configured to project a beam of X-rays 14 through an object 16. Object 16 may include a human subject, pieces of baggage, or other objects desired to be scanned. X-ray source 12 may be conventional X-ray tubes producing X-rays 14 having a spectrum of energies that range, typically, from ten (10) keV to two hundred (200) keV. The X-rays 14 pass through object 16 and, after being attenuated, impinge upon a detector assembly 18. Each detector module in detector assembly 18 produces electrical signals that represents the intensity of an impinging X-ray beam, and hence the attenuated beam, as it passes through the object 16. In one embodiment, detector assembly 18 is a scintillator based detector assembly, however, it is also envisioned that direct-conversion type detectors (e.g., CZT detectors, photon-counting detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the X-ray system 10 and view the reconstructed image or other data from computer 22 on a display unit 26. Additionally, console 24 allows an operator to store the generated image in a storage device 28 which may include hard drives, floppy discs, compact discs, cloud data storage, etc. The operator may also use console 24 to provide commands and instructions to computer 22 for controlling an X-ray source controller 30 that provides power and timing signals to X-ray source 12.

Figure 6:
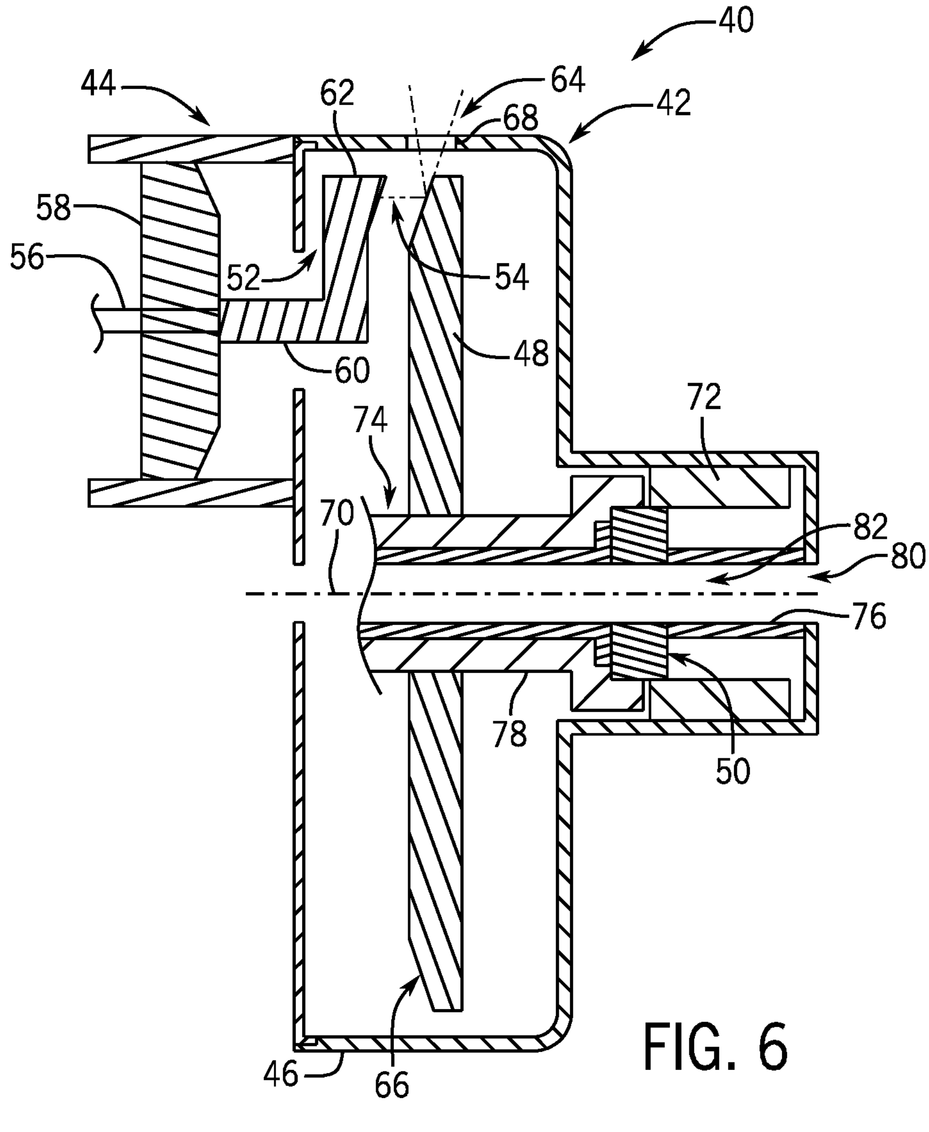
FIG. 6 is a cross-sectional view of a portion of an X-ray tube according to an exemplary embodiment of the disclosure.

FIG. 6 illustrates a cross-sectional view of an X-ray source 12 incorporating embodiments of the invention. In the illustrated embodiment, X-ray source 12 is an X-ray tube 40 that includes an anode assembly 42 and a cathode assembly 44. The anode and cathode assemblies 42, 44 are supported within an insert or frame 46, which houses a target or anode 48, a bearing assembly 50, and a cathode 52. Frame 46 defines an area of y low pressure (e.g., a vacuum) compared to ambient, in which high voltages may be present. Frame 46 may be positioned within a casing (not shown) filled with a cooling medium, such as oil, that may also provide high voltage insulation. While the target and anode are described above as being a common component of X-ray tube 40, the target and anode may be separate components in alternative X-ray tube embodiments.

In operation, an electron beam 54 is produced by cathode assembly 44. In particular, cathode 52 receives one or more electrical signals via a plurality of electrical leads 56. The electrical signals may include power and timing/control signals that cause cathode 52 to emit electron beam 54 at one or more energies and at one or more frequencies. The electrical signals may also at least partially control the potential between cathode 52 and anode 48. Cathode 52 includes an insulator 58 from which an arm 60 extends. Arm 60 encloses electrical leads 56, which extend into a cathode cup 62 mounted at the end of arm 60. In some embodiments, cathode cup 62 includes focusing elements that focuses electrons emitted from a filament within cathode cup 62 to form electron beam 54.

X-rays 64 are produced when high-speed electrons of electron beam 54 from cathode 52 are suddenly decelerated upon impacting a focal spot/target surface 66 formed on anode target 48. The high-speed electrons forming electron beam 54 are accelerated toward the anode target 48 via a potential difference therebetween of, for example, twenty (20) to one hundred and sixty (160) kV for medical diagnostic imaging, including sixty (60) kV or more in the case of CT applications. The X-rays 64 are emitted through a radiation emission window 68 formed in frame 46 that is positioned toward a detector array, such as detector 18 of FIG. 5.

Anode assembly 42 includes a rotor 72 and a stator (not shown) located outside X-ray source 40 and partially surrounding rotor 72 for causing rotation of anode/anode target 48 during operation. Anode target 48 is supported in rotation by a bearing assembly 50, which, when rotated, also causes anode target 48 to rotate about a centerline 70. As shown, anode target 48 has a generally annular shape, such as a disk, and an annular opening 74 in the center thereof for receiving bearing assembly 50.

Target 48 may be manufactured to include one or more metals or composites, such as tungsten, molybdenum, or any material that emit X-rays when bombarded with electrons. Target surface 66 of anode target 48 is selected to have a relatively high refractory value so as to withstand the heat generated by electrons impacting target surface 66, with the main properties for this selection being 1) melting temperature and 2) thermal conduction. In addition, to respect previous requirement of X-ray generation, the selected material must have an atomic number Z high enough with regards to the desired X-rays, for example, a Z as high as possible for Bremsstrahlung only, or with a specific Z if a specific or characteristic radiation to be generated is desired. Further, the space within insert or frame 46 and between cathode assembly 44 and anode assembly 42 is at vacuum pressure in order to avoid electron collisions with other atoms and to maximize an electric potential.

To avoid overheating of the target 48 when bombarded by the electrons, rotor 72 rotates target 48 at a high rate of speed (e.g., 50 to 250 Hz) about a centerline 70.

Bearing assembly 50 can be formed as necessary, such with a number of suitable ball bearings (not shown), but in the illustrated exemplary embodiment comprises a liquid lubricated or self-acting bearing, such as a liquid metal bearing, having adequate load-bearing capability and acceptable acoustic noise levels for operation within imaging system 10 of FIG. 5. As used herein, the terms “self-acting” and “self-lubricating” mean that the bearing lubricating fluid remains distributed on the surfaces of the bearing due to the relative motion of the bearing components and absent an external pump.

In general, bearing assembly 50 includes a stationary component, such as shaft 76, and a rotating component, such as sleeve 78 that surrounds the shaft 76 and to which the anode/anode target 48 is attached. While shaft 76 is described with respect to FIG. 6 as the stationary portion of bearing assembly 50 and sleeve 78 is described as the rotating portion of bearing assembly 50, embodiments of the present invention are also applicable to embodiments wherein the shaft 76, the rotating component, rotates within a stationary sleeve 78, a stationary component. In such a configuration, anode target 48 would rotate as shaft 76 rotates.

Figure 7:
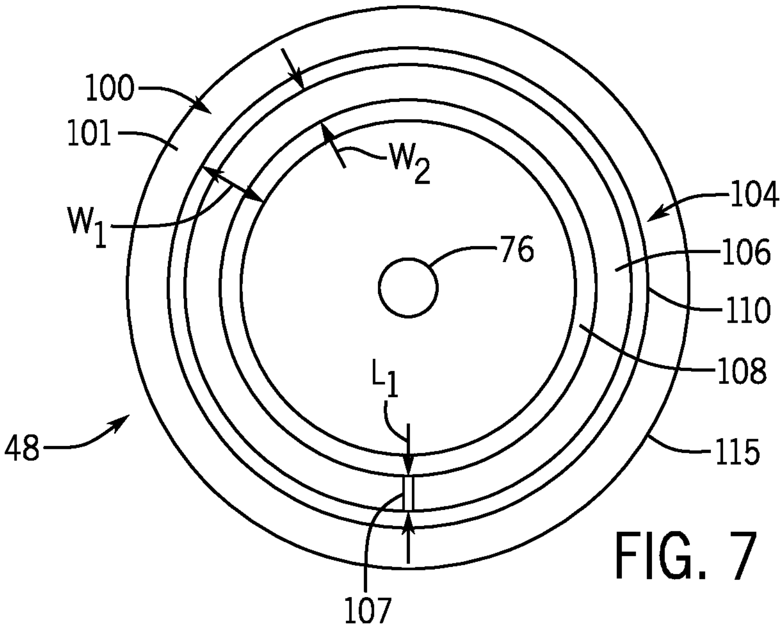
FIG. 7 is a top plan view of a first embodiment of an anode structure employed within the X-ray tube of FIG. 6, according to an exemplary embodiment of the disclosure.
Figure 8:
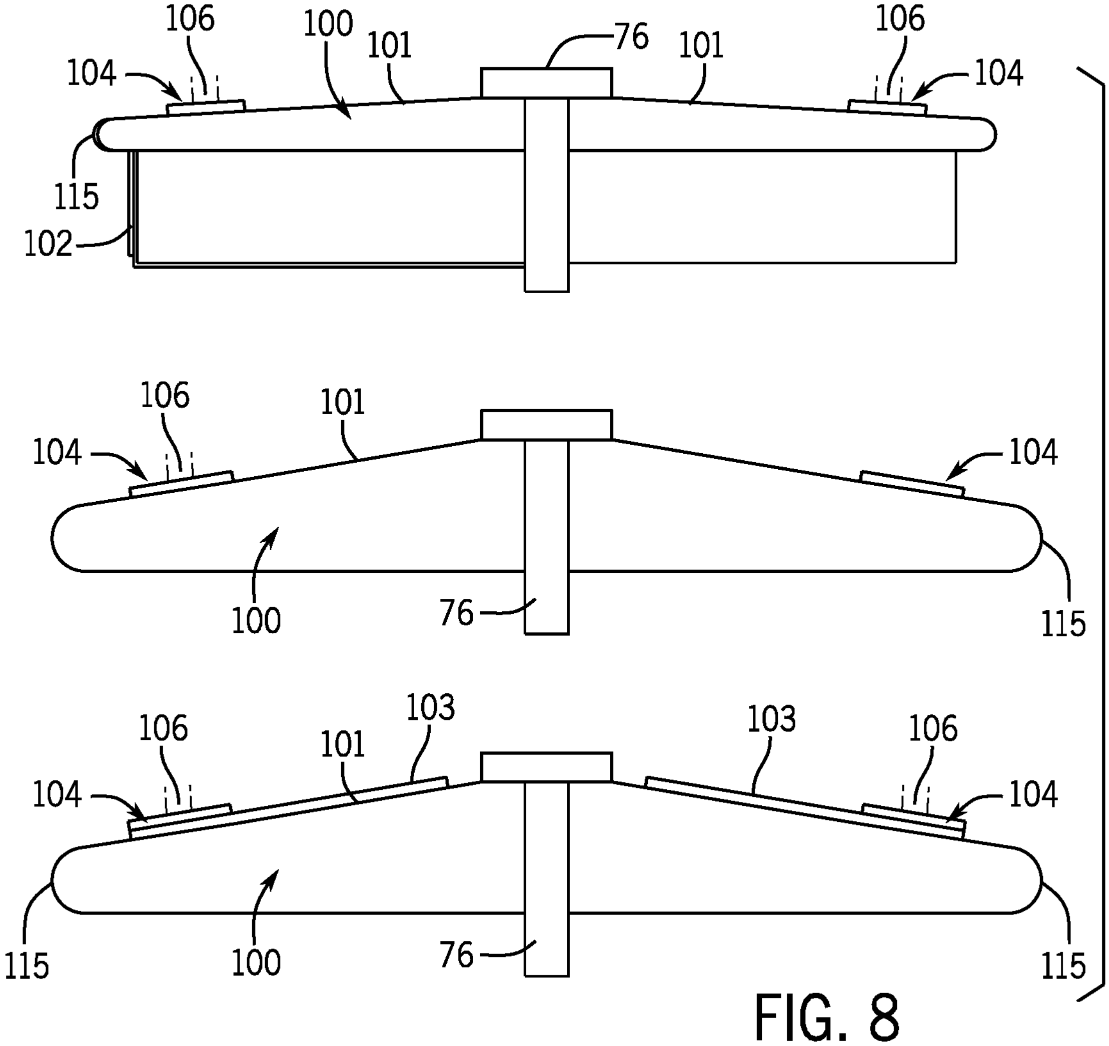
FIG. 8 are cross-sectional views of different anode construction embodiments for the anode of FIG. 7 with a single focal spot track, according to an embodiment of the disclosure.

Referring now to FIGS. 7 and 8, exemplary embodiments of the structure of the anode 48 of the present disclosure are illustrated. In each embodiment, the anode 48 includes a support structure or body 100 formed of a suitably, or relatively non-emissive substrate material, including a material having properties not adequate for efficient X-ray emission based on atomic number and/or local thermal properties, such as a molybdenum alloy or graphite, among others. The body 100 can additionally include one or more fins 102 attached to and extending outwardly from the body 100 that further enhance the heat dissipation from the body 100 during operation of the X-ray source 40 and the anode 48.

On a target surface 66 of the body 100 that is positioned to face the cathode 54 within the path of the electron beam 52 remitted from the cathode 54, the anode 48 includes an emissive material track 104 disposed thereon. The emissive material track 104 is formed of a suitably emissive material, including but not limited to tungsten and/or rhodium. In an exemplary embodiment of the disclosure, the difference between a first atomic number $Z_1$ of the material forming the emissive material track 104 and a second atomic number $Z_2$ of the relatively non-emissive material forming the body 100, or any other material 103 that is disposed on the surface 101 between the emissive material track 104 and the body 100 that is different than the material forming the body 100, should be at least 3% or more, or in another exemplary embodiment at least 7% or more, with the material forming the emissive material track 104 being higher in each case. In still a further exemplary embodiment, the ratio between the first atomic number $Z_1$ of the material forming the emissive material track 104 and the second atomic number $Z_2$ of the relatively non-emissive material forming the body 100, or any other material 103 that is disposed on the surface 101 between the emissive material track 104 and the body 100 that is different than the material forming the body 100, can be at least greater than 6, and in another exemplary embodiment is at least greater than 12, again with the material forming the emissive material track 104 being higher in each case. In one exemplary embodiment, the relatively non-emissive material forming the body 100 or material 103 is molybdenum, molybdenum alloy, or carbon, and the emissive material track 104 is formed from rhodium or tungsten alloy. In another exemplary embodiment, for medical imaging applications, highly emissive materials are molybdenum (Z=42) or rhodium (Z=45), in particular if their characteristic radiation spectrum is looked for, as in mammography, and in all applications, from mammography to CT etc., tungsten (Z=74) is preferred, alone or alloyed with rhenium (Z=75).

The emissive material track 104 is positioned on the body 100 to cover and/or encompass the focal spot track 106 followed by the focal spot 107 to be struck by the electron beam 52 as it moves due to rotation of the anode 48 during the operation of the X-ray source 40. The emissive material track 104 can be attached to the body 100 in any suitable manner, such as by welding or brazing the emissive material track 104 to the body 100, or by depositing material forming the emissive material track 104 directly onto the body 100 in a suitable manner to form the emissive material track 104.

In the illustrated exemplary embodiments, the emissive material track 104 has a planar, generally circular ring shape to extend round the body 100 along the entire path of the focal spot track 106, i.e., the track or path of the focal spot/target surface 66 along the anode 48 as the anode is rotated during operation of the X-ray tube 12, during rotation of the anode 48, with an inner diameter ring 108 and an outer diameter ring 110. The first width or width $W_1$ of the emissive material track 104 between the inner ring 108 and the outer ring 110 is larger than the second width or width $W_2$ of the focal spot track 106, as defined by the length $L_1$ of the focal spot 107 defining the focal spot track 106, such that the entire focal spot track 106 can be encompassed within the width $W_1$ emissive material track 104. Further, the width $W_1$ of the emissive material track 104 is significantly less than the radius R of the body 100 from the shaft 76 or sleeve 78 secured to the body 100 to a peripheral edge 115 of the body.

Figure 9:
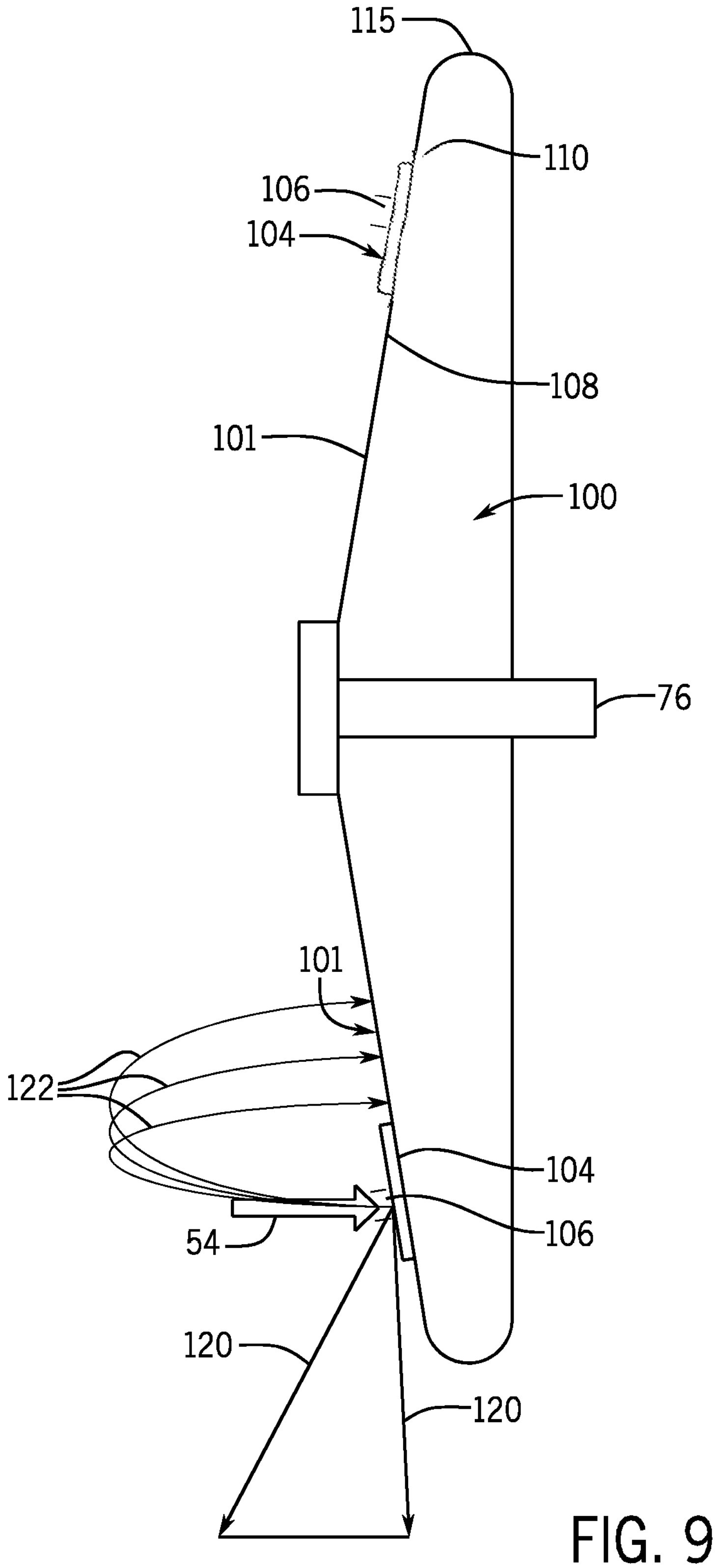
FIG. 9 is a schematic view of the elimination of off-focus radiation from electrons bouncing off of a focal spot track provided by the anode of FIG. 7 according to an exemplary embodiment of the disclosure.
Figure 10A:
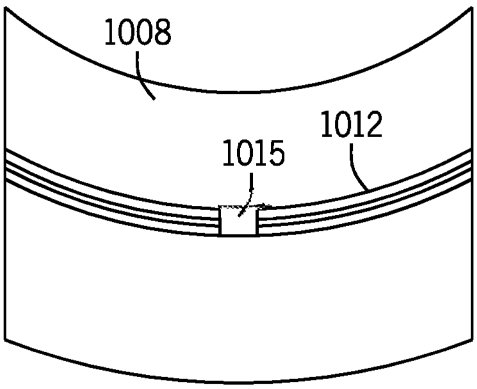
FIGS. 10A and 10B are comparisons of the emissive material layers on a prior art anode of FIG. 1 and the anode of FIG. 7 in comparison with a focal spot track of equal size, according to an exemplary embodiment of the disclosure.
Figure 10B:
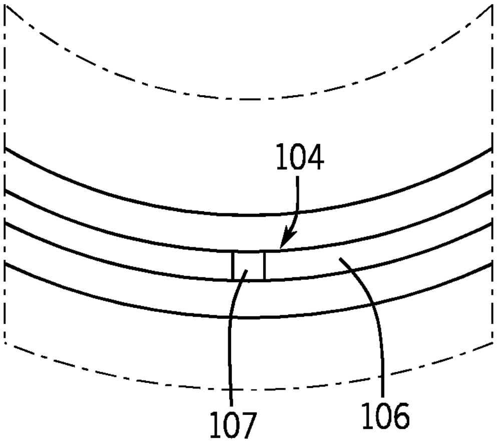

With this configuration for the emissive material track 104, referring to the schematic cross-sectional view of the anode 48 in FIG. 9, the cathode 52 is operated to emit the electron beam 54 to strike the rotating anode 48 along focal spot track 106 to cause the emissive material track 104 to emit X-rays 120 within the focal spot track 106 overlapping the emissive material track 104. As in the prior art, some of the electrons 122 within the electron beam 54 striking the emissive material track 104 can bounce or rebound off of the emissive material track 104, with some of these rebounding electrons 122 attracted back towards the anode 48. However, with the significant reduction in the width $W_1$ of the emissive material track 104 between the inner ring 108 and the outer ring 110, as schematically illustrated in FIGS. 10A and 10B showing the relative widths of the prior art emissive material layer 108, focal spot 1015 and focal spot track 1012, and the emissive material track 104, focal spot 107 and focal spot track 106 of the present disclosure, rebounding electrons 122 pass beyond the width $W_1$ of the emissive material track 104 and instead strike the body 100 formed of the suitably non-emissive substrate material to either side of the emissive material track 104. Thus, the rebounding electrons 122 do not cause X-rays 120 to be emitted from the emissive material layer 104 and thus reduce or eliminate any off-focus radiation being directed towards the object being imaged and the detector. Thus, the focus and overall image quality of the image produced by the detector from the X-rays passing through the object prior to reaching the detector with the anode 48 incorporating the emissive material track 104 is significantly improved over the prior art.

In an exemplary embodiment for the emissive material track 104, the width $W_1$ of the emissive material track 104 is determined to be between less than or equal to about two (2) times or less than or equal to about one and a half (1.5) times the width $W_2$ of the focal spot track 106. Further, in another exemplary embodiment, the emissive material track 104 extends outwardly to each side of the width $W_2$ of the focal spot track a specified distance, such that the edges of the focal spot track 106 are spaced inwardly from each of the inner ring 108 and the outer ring 110 of the emissive material track 104.

In one exemplary embodiment, as the width $W_2$ of the focal spot track 106 can be between about 0.10 mm to about 10.0 mm, the corresponding width $W_1$ of the emissive material track 104 between the inner ring 108 and the outer ring 110 can be between about 0.15 mm and 15.0 mm. In another alternative exemplary embodiment, the width $W_1$ of the emissive material track 104 between the inner ring 108 and the outer ring 110 can be between about 0.20 mm and 20.0 mm for the same width $W_2$ of the focal spot track 106. In one particular exemplary embodiment, the emissive material track 104 has a width $W_1$ of up to about 25 mm for the same width $W_2$ of the focal spot track 106. In another particular exemplary embodiment, the emissive material track 104 can have an outer ring 110 that conforms to a peripheral edge 115 of the body 100, such that the emissive material track 104 can wrap around outer edge 115 of the body 100.

In still another alternative exemplary embodiment, regardless of the actual width of the emissive material track 104, the focal spot track 106 is centered within the emissive material track 104. In still a further alternative exemplary embodiment, the emissive material track 104 extends outwardly to each side of the focal spot track 106 a distance of approximately one quarter of the width $W_2$ of the focal spot track 106.

Figure 11:
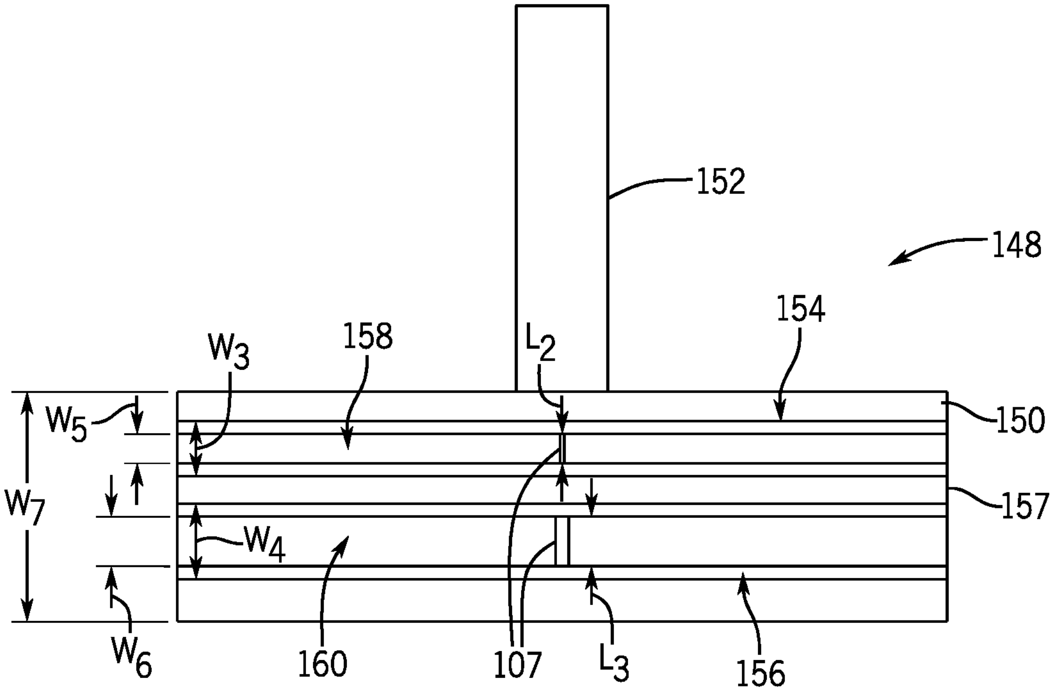
FIG. 11 is a side elevational view of a second embodiment of an anode structure according to an exemplary embodiment of the disclosure.

Referring now to FIG. 11, in another illustrated exemplary embodiment, an anode 148 includes a body 150 defining a peripheral surface 151 towards which an electron beam 54 is directed and formed of a suitable, or relatively non-emissive substrate material, similar or identical to the material forming body 100, and a shaft 152 operably connected to the body 150 and extending outwardly therefrom for attachment within a compatible X-ray source (not shown). The body 150 can be formed to have any of a multitude of suitable configurations, such as a body 150 that is conic in shape, with one or more angles between the cone of the body 150 and the axis defined by the shaft 152. In the exemplary illustrated embodiments of FIGS. 11 and 12, the body 150 is formed with a cylindrical shape, with the shaft 152 operably connected along a central axis of the body 150, and includes a pair of emissive material tracks 154,156 formed of materials similar to that of emissive material track 104 and disposed around the perimeter of the body 150. Further, the percentage difference and/or that rations for the first and second atomic numbers of the materials forming the body 150 and the emissive material tracks 154,156 can be the same as described previously with regard to body 100 and emissive material track 104.

Figure 12:
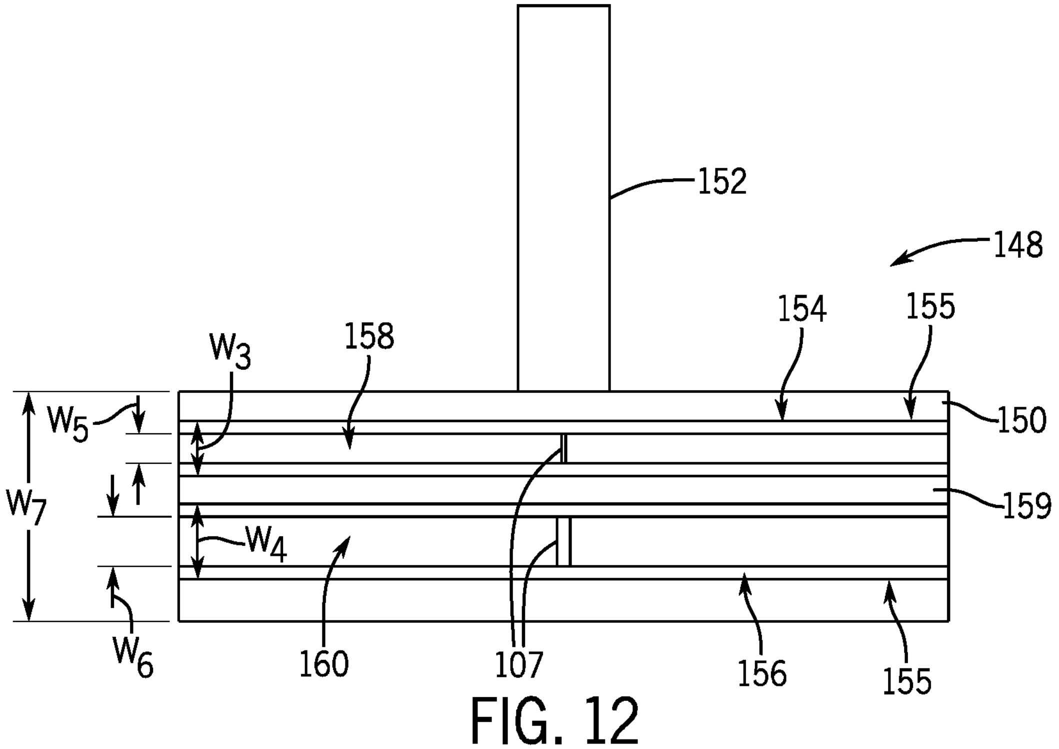
FIG. 12 is a side elevational view of a third embodiment of an anode structure according to an exemplary embodiment of the disclosure.

The emissive material tracks 154,156 can be spaced from one another, exposing one or more portions of the body 150, or any other material 153 that is disposed on the surface 151 between the emissive material tracks 154,156 and the body 150 that is different than the material forming the body 150, between the pair of emissive material tracks 154,156. The emissive material tracks 154,156 can be formed of the same type of emissive material, or can be formed from different types of emissive materials, such as chromium, aluminum, yttrium, zirconium, magnesium, silicon, silver, titanium, molybdenum, rhodium and tungsten. Alternatively, as shown in FIG. 12, the tracks 154,156 can be formed from a unitary layer 155 of emissive material having a blocking strip 157 of a lower X-ray emission capability material, i.e., low atomic number Z, disposed thereon, similar to body 150, thereby separating the unitary layer 155 into the emissive material tracks 154,156.

The emissive material tracks 154,156 each have a different width, $W_3$ for track 154 and $W_4$ for track 156, such that the tracks 154 and 156 accommodate focal spot tracks 158,160 having different widths, i.e., $W_5$ for focal spot track 158 and $W_6$ for focal spot track 160 corresponding to the lengths $L_2$ and $L_3$ of the focal spots 107 defining each focal spot track 158,160, and that are each less than the width $W_7$ of the surface 151 of the body 150. The widths $W_3$ and $W_4$ of the emissive material tracks 154,156 each conform to the widths $W_5$ and $W_6$ for the focal spot tracks 158,160 according to the parameters of one or more of the embodiments discussed previously with regard to the anode 48 and the emissive material track 104 and focal spot track 106 disposed thereon. Further, with this configuration for the anode 148, the single anode 148 can be employed for use in imaging procedures requiring different focal lengths, as the electron beam 54 can be directed onto the desired focal spot 107 and associated focal spot track(s) 158,160 and emissive material track(s) 154,156 to provide the improvements to the operation of the anode 148 provided by the emissive material tracks 154,156 as discussed previously.

Figure 13:
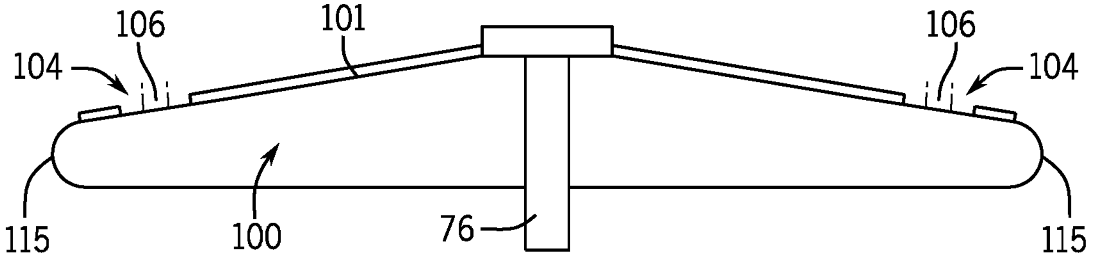
FIG. 13 is a cross-sectional view of the anode of FIG. 7 with a single focal spot track, according to another exemplary embodiment of the disclosure.

In still another exemplary embodiment of the disclosure, referring now to FIG. 13, the anode 48 can be formed with a body 100 formed of an emissive material, i.e., with a high atomic number $Z_1$, similar to that used for the emissive material tracks 104,154,156, such as that described previously. To limit the areas on the body 100 that can be struck with the rebounding electrons 122 to emit off-focus X-rays, the body 100 is covered in part by a blocking cover 162 formed of a low x-ray emission material as used with prior embodiments for the body 100 shown in FIGS. 7-12, i.e., with a low atomic number $Z_2$, that exposes only those areas of the body 100 that function as the emissive material track(s) 104,154,156 around the focal spot track(s) 106,158, 160. In this construction, as only the area of the body 100 functioning as the emissive material track(s) 104,154,156 for the focal spot track(s) 106,158,160 is exposed by the blocking cover 162, the potential for rebounding electrons 122 to strike the body 100 outside of the exposed areas of the body 100 functioning as the emissive material track(s) 104,154,156 for the focal spot track(s) 106,158,160 is significantly reduced or eliminated.

The cover 162 can be deposited in any suitable manner on the areas of the body 100 outside of the focal spot track(s) 106,158, 160, with the material forming the cover 162 having suitable non-emission properties and a thickness of between 10 μm-100 μm, in one exemplary embodiment.

Figure 14:
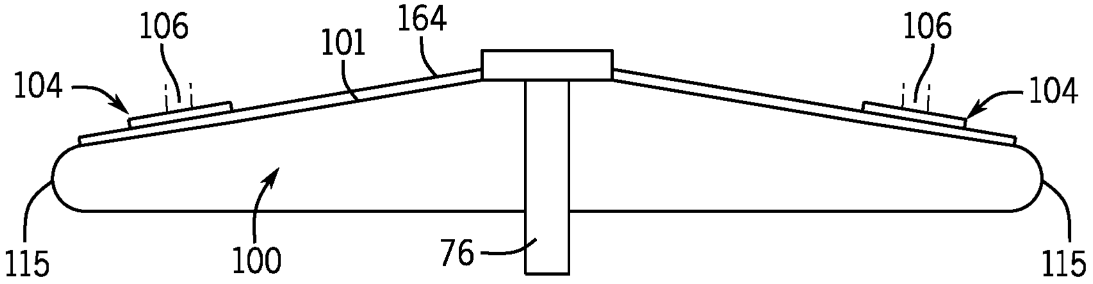
FIG. 14 is a cross-sectional view of the anode of FIG. 7 with a single focal spot track, according to a further exemplary embodiment of the disclosure.

In still another exemplary embodiment of the disclosure, referring now to FIG. 14, the body 100 can include a thermally conductive cover 164 formed of a low x-ray emission material such as used with prior embodiments for the body 100 shown in FIGS. 7-12, i.e., with a low atomic number $Z_2$ that is located over the entire surface 101 of the body 100, e.g., can be deposited over the entirety of the body 100. The material forming the thermally conductive cover 164, such as a carbon material, e.g., carbon in diamond form, is capable of having the emissive material track(s) 104,154, 156 deposited directly thereon over the area(s) of the body 100 and the cover 164 defining and/or aligned with the focal spot track(s) 106,158,160. In this construction, the thermally conductive cover 164 effectively prevents or limits the potential for rebounding electrons 122 to strike the body 100 outside of the emissive material track(s) 104,154,156 defining the focal spot track(s) 106,158,160, while also improving heat conductivity from the emissive material track(s) 104,154,156 defining the focal spot track(s) 106,158,160 to the remainder of the thermally conductive cover 164 and body 100 due to the improved thermal conductivity properties of the material forming the thermally conductive cover 164.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An anode for an X-ray tube comprising:

a rotating component;

a body operably connected to the rotating component and adapted to rotate in conjunction with the rotating component; and at least one emissive material track defined on the body wherein the at least one emissive material track consists of a single layer of emissive material and has a first width, wherein the first width is less than or equal to twice a second width of a focal spot track on the body, and wherein the first width is greater than the second width of the focal spot track.

2. The anode of claim 1, further comprising a blocking cover disposed on the body and exposing areas of the body defining the at least one emissive material track.

3. The anode of claim 2, wherein the body is formed of a material having a first atomic number and wherein the blocking cover is formed of a material having a second atomic number and wherein a ratio of the first atomic number to the second atomic number is at least 6.

4. The anode of claim 3, wherein the ratio of the first atomic number to the second atomic number is at least 12.

5. The anode of claim 3, wherein the first width is less than or equal to about one and one half times the second width.

6. The anode of claim 3, wherein the second width is between about 0.10 mm to about 10.0 mm.

7. The anode of claim 1, wherein the emissive material track is formed of a material having a first atomic number and wherein the body is formed of a material having a second atomic number and wherein a ratio of the first atomic number to the second atomic number is at least 6.

8. The anode of claim 1, further comprising a thermally conductive cover disposed on the body; and wherein the at least one emissive material track is disposed on the thermally conductive cover opposite the body.

9. The anode of claim 1, wherein the at least one emissive material track is ring-shaped, having an inner diameter ring and an outer diameter ring, and wherein the first width is defined between the inner diameter ring and the outer diameter ring.

10. The anode of claim 1, wherein the first width is between about 0.15 mm and about 25.0 mm.

11. The anode of claim 1, further comprising:

a second emissive material track disposed on the body and spaced from the first emissive material track.

12. The anode of claim 11, wherein the first emissive material track width is different than the second emissive material track width.

13. The anode of claim 11, wherein the first emissive material track and the second emissive material track expose a portion of the body therebetween.

14. The anode of claim 11, wherein the first emissive material track and the second emissive material track are formed of a unitary layer, and wherein a blocking strip is disposed on the unitary layer to define the first emissive material track and the second emissive material track on the unitary layer to each side of the blocking layer.

15. A method for minimizing off focus radiation generated in an imaging procedure using an X-ray tube, the method comprising the steps of:

providing an X-ray tube comprising:

a cathode assembly; and an anode assembly spaced from the cathode assembly, wherein the anode assembly comprises:

a shaft;

a sleeve disposed on the shaft, wherein one of the shaft and the sleeve is rotatable with regard to the other to form a rotating component and a stationary component;

a body attached to the rotating component; and at least one emissive material track defined on the body; wherein the at least one emissive material track has a first width, wherein the first width is less than or equal to twice a second width of a focal spot track on the body, and wherein the first width is greater than the second width of the focal spot track;

directing the electron beam from the cathode assembly onto at least one the emissive material track along the focal spot track; and enabling electrons from the electron beam bouncing off of the emissive material track to contact the body on either side of the at least one emissive material track, wherein the emissive material track is formed of a material having a first atomic number and wherein the body is formed of a material having a second atomic number and wherein a ratio of the first atomic number to the second atomic number is at least 6.

16. An X-ray tube comprising:

a cathode assembly; and an anode assembly spaced from the cathode assembly, wherein the anode assembly comprises:

a shaft;

a sleeve disposed on the shaft, wherein one of the shaft and the sleeve is rotatable with regard to the other to form a rotating component and a stationary component;

a body attached to the rotating component; and at least one emissive material track disposed on the body, wherein the at least one emissive material track has a first width, wherein the first width is less than or equal to twice a second width of a focal spot track on the body, and wherein the first width extends outwardly at least 25% of the second width to each side of the focal spot track.

17. The X-ray tube of claim 16, wherein the at least one emissive material track has a width less than or equal to about one and one half times the width of the focal spot track.

18. The X-ray tube of claim 16, wherein the emissive material track is formed of a material having a first atomic number, wherein the body is formed of a material having a second atomic number, and wherein a ratio of the first atomic number to the second atomic number is at least 6.

19. The X-ray tube of claim 16, further comprising:

a second emissive material track disposed on the body and spaced from the first emissive material track.

20. The X-ray tube of claim 19, wherein the first emissive material track width is different than the second emissive material track width.

* * * * *